United States Patent
Keshav et al.

(10) Patent No.: US 8,442,554 B2
(45) Date of Patent: May 14, 2013

(54) METHOD FOR IDENTIFYING LOCATION OF MOBILE DEVICE IN WIRELESS COMMUNICATION NETWORK

(75) Inventors: Kirti Keshav, Bangalore (IN); Ravikumar Kalaimani, Bangalore (IN)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/118,827

(22) Filed: May 31, 2011

(65) Prior Publication Data
US 2011/0312337 A1    Dec. 22, 2011

(30) Foreign Application Priority Data

Jun. 17, 2010   (IN) .......................... 1694/CHE/2010
May 4, 2011    (KR) ........................ 10-2011-0042610

(51) Int. Cl.
   *H04W 24/00*   (2009.01)
(52) U.S. Cl.
   USPC .................. 455/456.1; 370/252; 342/357.31
(58) Field of Classification Search .............. 455/456.1; 370/252; 342/357.43–357.46
   See application file for complete search history.

(56) References Cited

U.S. PATENT DOCUMENTS

| | | | |
|---|---|---|---|
| 2002/0019698 A1* | 2/2002 | Vilppula et al. | 701/207 |
| 2004/0092270 A1* | 5/2004 | Banno | 455/456.1 |
| 2004/0185870 A1* | 9/2004 | Matsuda | 455/456.1 |
| 2005/0143916 A1* | 6/2005 | Kim et al. | 701/214 |
| 2005/0267677 A1* | 12/2005 | Poykko et al. | 701/207 |
| 2007/0279281 A1* | 12/2007 | Oda et al. | 342/357.06 |
| 2007/0281662 A1* | 12/2007 | Kim et al. | 455/404.2 |
| 2010/0232301 A1* | 9/2010 | Omori | 370/252 |
| 2010/0238070 A1* | 9/2010 | Harper et al. | 342/357.46 |
| 2010/0240386 A1* | 9/2010 | Hamabe et al. | 455/452.2 |
| 2010/0255856 A1* | 10/2010 | Kansal et al. | 455/456.1 |
| 2011/0171912 A1* | 7/2011 | Beck et al. | 455/67.11 |
| 2012/0057493 A1* | 3/2012 | Omori | 370/252 |

* cited by examiner

*Primary Examiner* — Jean Gelin
*Assistant Examiner* — Nathan Taylor
(74) *Attorney, Agent, or Firm* — Cha & Reiter, LLC

(57) ABSTRACT

A method and system for identifying the location of a mobile device in a wireless communication network includes identifying Hierarchical Cell Structure (HCS) priority number of a cell in which the mobile device is currently camped. A first positioning method is selected to identify the location of the mobile device when the HCS priority number is greater than a first predefined number, and a second positioning method is selected when the HCS priority number is smaller than a second predefined number. The method also performs a probabilistic method to select a positioning method from the first posting method and the second positioning method when the HCS priority number is between the first predefined number and the second predefined number.

12 Claims, 4 Drawing Sheets

METHOD FOR IDENTIFYING LOCATION OF MOBILE DEVICE IN WIRELESS COMMUNICATION NETWORK

CLAIM OF PRIORITY

This application claims priority under 35 U.S.C. §119 to a Indian Patent Application filed in the Indian Patent Office on Jun. 17, 2010 and assigned Serial No. 1694/CHE/2010, and of a Korean patent application filed in the Korean Intellectual Property Office on May 4, 2011, and assigned Ser. No. 10-2011-0042610, the entire disclosure of each of which is hereby incorporated by reference.

FIELD OF THE INVENTION

The present invention relates to identifying the location of a mobile device in a wireless communication network. More particularly the present invention relates to selecting a location identifying method to best identify the location of the mobile device in a wireless commutation network.

BACKGROUND OF THE INVENTION

Nowadays, wireless communication devices are equipped with various enhanced features to identify its current geographical location. Examples of wireless communication devices include Mobile devices, Laptops, Personal Digital Assistants (PDA) and the like. Many wireless communication devices, for example mobile devices, are equipped with GPS navigators to identify its current location. Hence, a mobile device in the wireless communication network, upon receiving a request to find its co-ordinates or current geographical location, automatically switches on the GPS module for resolving geographical bearings.

Another method to identify current location is the use of Wi-Fi triangulation method and Bluetooth triangulation method. In this method, the location of a particular Wi-Fi base station to which the mobile device is currently associated is identified. However, the main challenge lies in clearly identifying the physical location of the mobile device, physical location being indoors and outdoors of a building.

Though, GPS method is more accurate of the available methods and is also a preferred one, but its signal intensity is quite weak and also requires open-sky and line of sight ambience. Due to these reasons, ordinary mobile devices need to spend a lot of battery power to detect and process the satellite signals before the geographic co-ordinates are finally resolved. Moreover, locating mobile device during indoor operations is even more difficult using GPS method due to the aforementioned reasons. Further, the Wi-Fi method is used for indoor environment, as the Wi-Fi is generally available in indoor environment.

Currently, there is no method available to Mobile Station to estimate the type of environment (indoor or outdoor) that the mobile device is experiencing and to identify method based on the current environment. For example, in second generation (2G) wireless communication networks and third generation (3G) wireless communication networks, there is no Information Element (IE) in the network's System Information Broadcast (SIBs) Messages or signaling procedure, that can tell if the mobile device is in indoor environment or outdoor environment. Similarly, currently there exists no other procedure in 3$^{rd}$ Generation Partnership Project (3GPP) specifications by which mobile device can know if the mobile device is in indoor environment or outdoor environment. Thus, after receiving request to identify location, the mobile device generally starts with pre-defined ways of scanning for signal for each of the technology to arrive at best location estimation method to be used. Accordingly, the unnecessary scans lead to the drainage of battery resources in the mobile devices in the current schemes.

Hence, there exists a need to efficiently determine the best location identifying method during operation to identify the location of the mobile device.

SUMMARY OF THE INVENTION

An aspect of the present invention is to address at least the above-mentioned problems and/or disadvantages and to provide at least the advantages described below. Accordingly, an aspect of the present invention is to provide a system and method for identifying location of a mobile device in a wireless communication network.

In accordance with an aspect of the present invention, a method for identifying location of a mobile device in a wireless communication network includes identifying Hierarchical Cell Structure (HCS) priority number of a cell in which the mobile device is currently located. The HCS priority number falls within a predefined range defined in the wireless communication network, and the HCS priority number information is received from the communication network. The method then selects a first positioning method to identify the location of the mobile device when the HCS priority number is greater than a first predefined number. Further, the method selects a second positioning method to identify the location of the mobile device when the HCS priority number is smaller than a second predefined number. Thereafter, the method performs a probabilistic method to select a positioning method from either the first posting method or the second positioning method to best identify the location of the mobile device when the HCS priority number is between the first predefined number and the second predefined number.

In accordance with another aspect of the present invention, a method for identifying location of a mobile device in a wireless communication network includes reading femto cell status in the wireless communication network. Then, the method selects a first positioning method to identify the location of the mobile device when the femto cell is serving the mobile device and the mobile device is using the femto cell for communication. The method further selects a second positioning method to identify the location of the mobile device when the mobile device is using a cell other than the femto cell for communication.

In accordance with yet another aspect of the present invention, a mobile device includes a processor and a transceiver. The transceiver receives a Hierarchical Cell Structure (HCS) priority number from a wireless communication system. The processor identifies the HCS priority number of a cell in which the mobile device is currently located. The processor is also capable of selecting a first positioning method to identify the location of the mobile device when the HCS priority number is greater than a first predefined number. The processor then selects a second positioning method to identify the location of the mobile device when the HCS priority number is smaller than a second predefined number. The processor also performs a probabilistic method to select a positioning method from the first posting method and the second positioning method to identify the location of the mobile device when the HCS priority number is between the first predefined number and the second predefined number.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Figure 1:
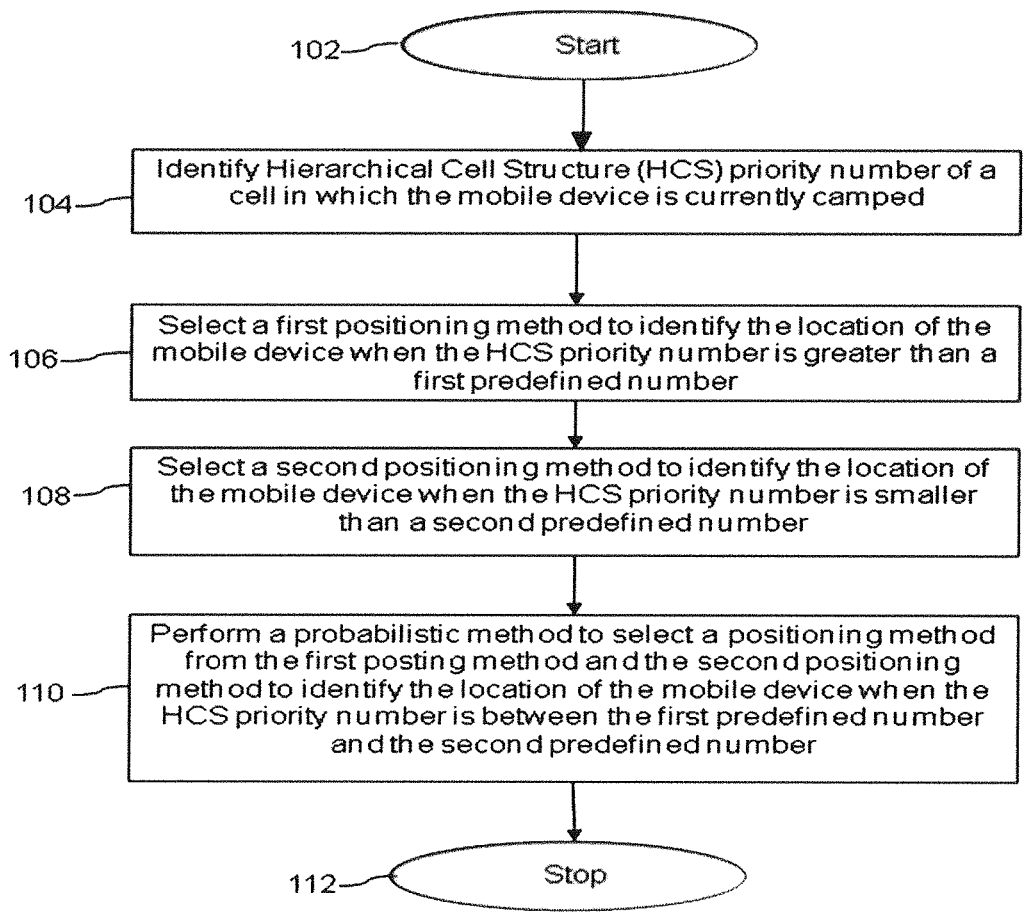
FIG. 1 illustrates a flow diagram of identifying location of a mobile device in accordance with an exemplary embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 4, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

FIG. 1 is a flow diagram illustrating the process of identifying the location of a mobile device in accordance with an exemplary embodiment of the present invention;

Referring to FIG. 1, a method 100 is initiated at step 102. At step 104, the method identifies Hierarchical Cell Structure (HCS) priority number of a cell in which the mobile device is currently located. In the embodiment, the priority number falls within a predefined range, from zero to seven, defined in the wireless communication network. The HCS priority number information is received from the communication network. For example, the HCS system of GSM and UMTS system is one such technique, which has up to eight level of hierarchy of cells for better load control. Broadly, the cells have been categorized as Macro, Micro and Pico cells. They can be used to infer whether a cell supports a large or small area. Similarly, femto cells of newer communication systems (like LTE, Release 8 onwards) give an idea that it is indoor environment. Note that the wireless communication device may be a second and/or a third generation wireless communication standard as well as other next generation wireless communication standard.

At step 106, a first positioning method is selected to identify the location of the mobile device when the HCS priority number is greater than a first predefined number. For example, the first predefined number may be five. In the embodiment, the first positioning method is a positioning method suitable for indoor and low mobility environment, wherein the positioning method suitable for indoor and low mobility environment is at least one of a Cell-Identification method, an Enhanced Observed Time Difference method, and a Wireless Fidelity (WiFi) Positioning System location estimation method. Thus, the first positioning method is selected when the mobile device is in indoor environment and information regarding the indoor environment is identified based on the HCS priority number.

At step 108, a second positioning method is selected to identify the location of the mobile device when the HCS priority number is smaller than a second predefined number. For example, the second predefined number may be two. In the embodiment, the second positioning method is a positioning method suitable for outdoor and high mobility environment. The positioning method suitable for outdoor and high mobility environment is at least one of a Global Positioning System (GPS), an Assisted GPS (AGPS) method and one of a satellite method.

At step 110, the method 100 performs a probabilistic method to select a positioning method amongst the first positioning method and the second positioning method to identify the location of the mobile device when the HCS priority number is between the first predefined number and the second predefined number. Thus, the probabilistic method is performed when the HCS priority value is greater than the value one and smaller than the value six, i.e., between two and five.

The inventive method makes use of Hierarchical Cell Structure (HCS) in wireless communications system for identifying location of the mobile device. In the method, a cell at which the mobile device is currently positioned is identified. This can be done by procuring the HCS priority value. This data is collected within a reasonable duration and a probability model is built in order to arrive at a decision as to ascertain physical location of the mobile device.

For example, high values of HCS priority indicate an encampment at a higher priority cell, like a pico-cell, which indicates that the mobile device is possibly located indoors, and vice-versa. In accordance to this detection mechanism, a decision is made to initiate a suitable means of detection that is either indoor location estimation or outdoor location estimation method to be chosen to resolve the exact geographical bearings of the mobile device. The location information obtained thence will be used to provide a host of Locations Based Services (LBS) in accordance to the preferences of the user. Then, to use the LBS, mobile device has to find the location information to choose a proper method among the many location estimation method available, for example a GPS method, an A-GPS method, a WPS method, a Cell-ID method, an OTDOA method and/or an E-OTD method. At step 112, the method 100 is terminated.

Figure 2:
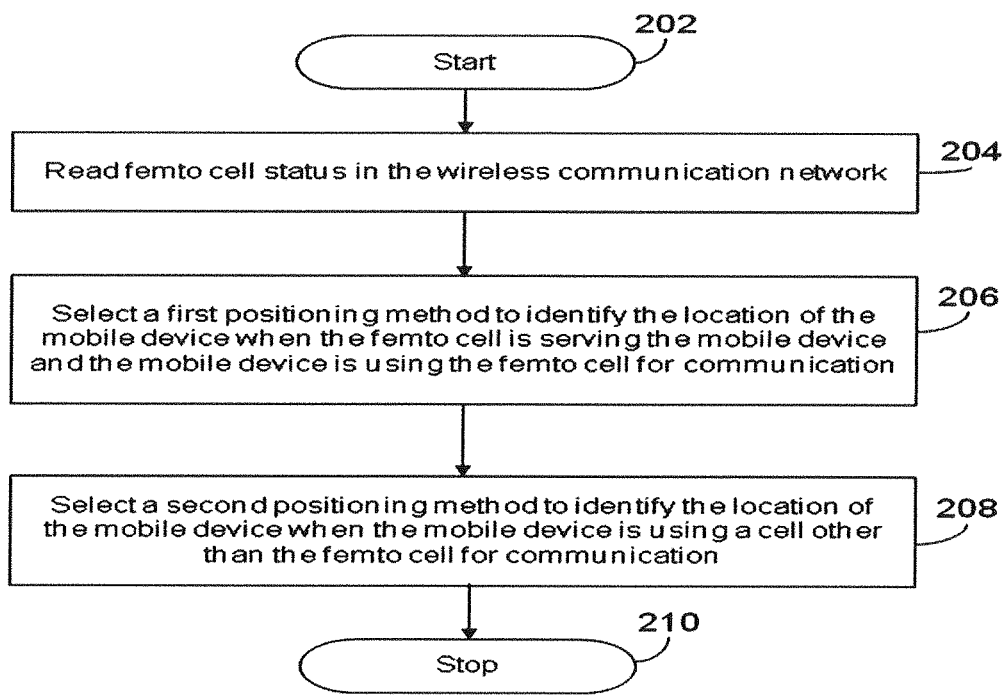
FIG. 2 illustrates a flow diagram of identifying location of a mobile device in accordance with another exemplary embodiment of the present invention.

FIG. 2 is a flow diagram illustrating the process of identifying the location of a mobile device in accordance with another exemplary embodiment of the present invention.

Referring to FIG. 2, the method 200 is initiated at step 202. At step 204, the method performs reading of femto cell status in the wireless communication network. In the embodiment, the wireless communication network may be a Long Term Evolution communication standard and/or a Release 8 a third generation wireless communication standard.

At step 206, a first positioning method is selected to identify the location of the mobile device when the femto cell is serving the mobile device, and the mobile device is using the femto cell for communication. In the embodiment, the first positioning method is at least one of a Cell-Identification method, an Enhanced Observed Time Difference method, and a Wireless Fidelity (WiFi) Positioning System (WPS) positioning system method. Thus, the first positioning method is selected when the mobile device is in indoor environment as the mobile device is associated with the femto cell.

At step 208, a second positioning method is selected to identify the location of the mobile device when the mobile device is using a cell other than the femto cell for communication. In the embodiment, the second positioning method is at least one of a Global Positioning System (GPS), an Assisted GPS (AGPS) method and one of a satellite method. Thus, the second positioning method is selected when the mobile device is in outdoor environments the mobile device is not associated with the femto cell. At step 210 the method 200 is terminated.

Figure 3:
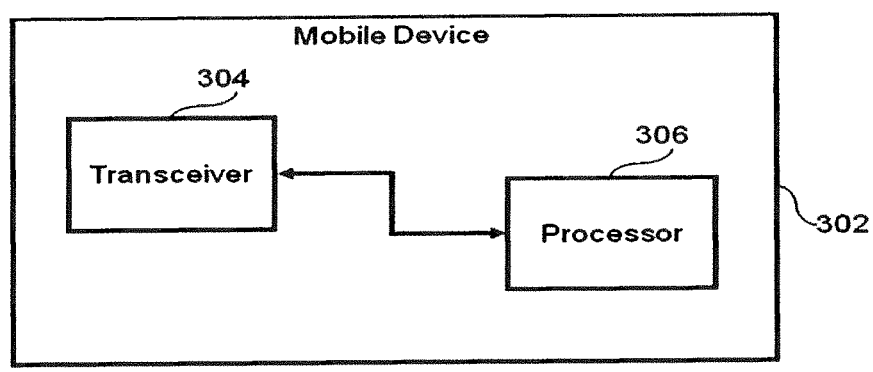
FIG. 3 illustrates a mobile device in accordance with an exemplary embodiment of the present invention.

FIG. 3 illustrates a mobile device in accordance with an exemplary embodiment of the present invention.

Referring to FIG. 3, the mobile device 302 is provided. The mobile device 302 includes a transceiver 304 and a processor 306. The transceiver 304 receives a Hierarchical Cell Structure (HCS) priority number from a wireless communication system. The processor 306 then identifies the HCS priority number of a cell in which the mobile device 302 device is currently positioned. The processor 306 is also capable of selecting a first positioning method to identify the location of the mobile device 302 when the HCS priority number is greater than a first predefined number.

The processor 306 also selects a second positioning method to identify the location of the mobile device 302 when the HCS priority number is smaller than a second predefined number. The processor 306 also performs a probabilistic method to select a positioning method from the first posting method and the second positioning method to identify the location of the mobile device when the HCS priority number falls between the first predefined number and the second predefined number.

Figure 4:
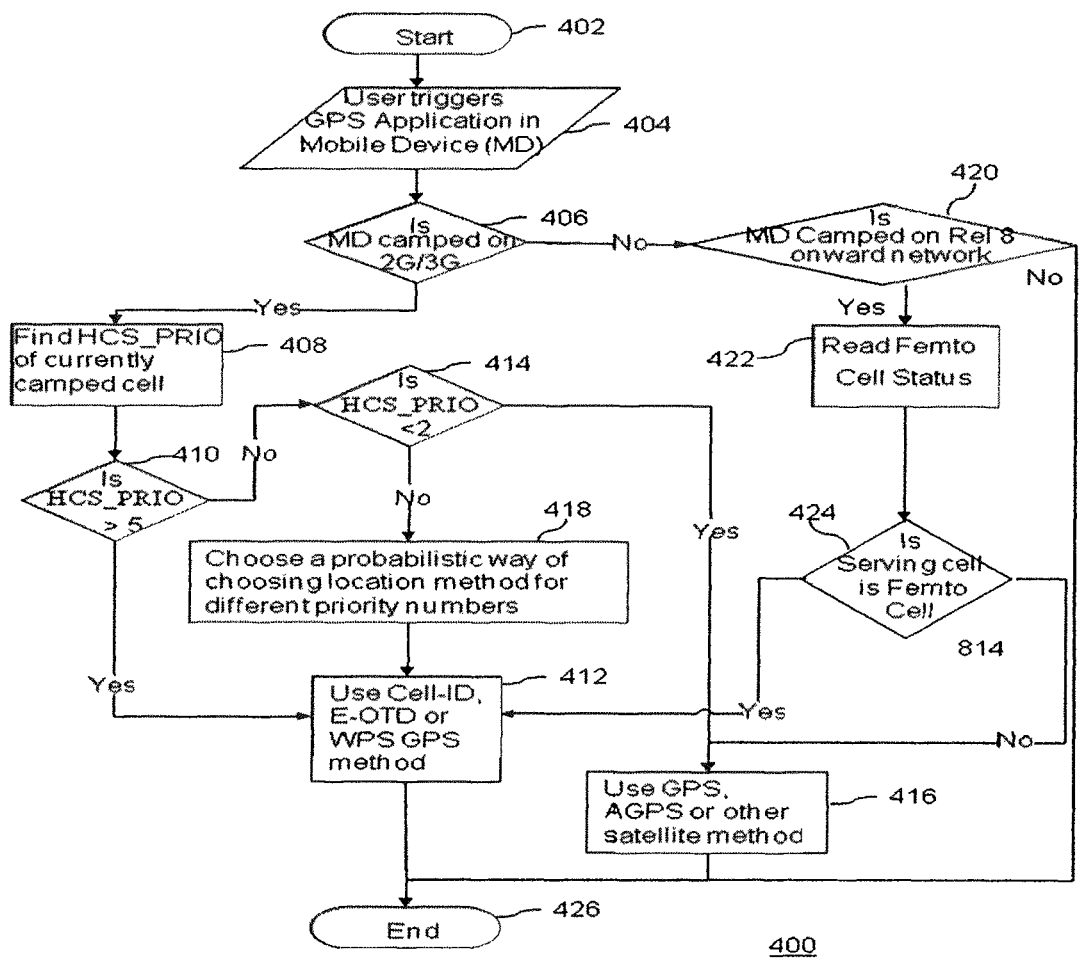
FIG. 4 illustrates a flow diagram of identifying location of a mobile device in accordance with yet another exemplary embodiment of the present invention.

FIG. 4 is a flow diagram to identify location of a mobile device in accordance with yet another exemplary embodiment of the present invention Referring to FIG. 4, the method 400 is initiated at step 402. At step 404, a user of a mobile device triggers a GPS application to identify the location of the mobile device. At step 406, the method identifies if the mobile device is located in a 2G network or a 3G network. In the embodiment, the method performs step 420 if the mobile device is not camped on 2G network or 3G network. However, if the mobile device is camped on 2G network or 3G network, then step 408 is performed.

At step 408, the method finds out HCS priority (HCS_PRIO) of a cell in which the mobile device is currently camped. In the embodiment, the HCS cells are given priorities from zero to seven (0-7) where zero ('0') is the lowest priority and seven ('7') is the highest priority. For example, the macro cells are given lower priority and micro/pico cells in buildings, are given highest priority.

As per the cell reselection rules, a mobile device in high mobility tries to reselect to the lower priority cells to avoid continuous reselections. Similarly, for stationary mobile device, based on the HCS priority of cell, it can be estimated if it is indoor or outdoor method. For example, the HCS priority range varies typically from zero to seven ('0' to '7'). The HCS_PRIO zero to one ('0' to '1') are generally used for pico cells (inside the hospital/office buildings) and two to five ('2' to '5') range is used for micro cell (for example in city centre, towns). Further, six to seven ('6' to '7') is generally used for macro cell (that is for area covering radius of few kilometers). Hence, if HCS_PRIO of current cell is in the extreme end ('0' to '1' or '6' to '7') then, information regarding indoor and outdoor environment can be directly assumed and initial location based method can be chosen accordingly. However if HCS_PRIO is in medium range ('2' to '5') then a probabilistic method is used to select the location based method, as explained later.

At step 410, the method identifies if the HCS_PRIO is greater than the value five or not. The method 400 then chooses a location method suitable for indoor and low mobility environment if the HCS_PRIO is greater than five ('5') otherwise the method performs a step 414. At step 412, the method selects one location method to identify the location of the mobile device. The location method is one of a Cell-Identification method (Cell-id), an Enhanced Observed Time Difference method, or a Wireless Fidelity (WiFi) Positioning System (WPS) method. Thereafter, the step 426 is performed.

At step 414, the method then identifies whether the HCS_PRIO is less than the value two ('2'). If the HCS_PRIO is less than the value two, then the positioning method suitable for outdoor and high mobility environment is chosen. At step 416, the method chooses a Global Positioning System (GPS), an Assisted GPS (AGPS) method or a satellite method. Thereafter, the step 426 is performed.

If the HCS_PRIO is between two and five then a probabilistic way of choosing location method is performed at step 418. For example, with probability 0.8(80% probability), 0.6 (60% probability), 0.4(40% probability) and 0.2(20% probability), the method of Cell-id, WPS for HCS_PRIO 2, 3, 4 and 5 respectively can be used. For example, a cell with HCS_PRIO equals to '2', it can be considered that the mobile device is located outdoors with 80% probability. Thus, an outdoor method can be tried first for finding mobile device location with HCS_PRIO 2.

A cell with HCS_PRIO equals to '3', it can be considered that the mobile device is located outdoors with 60% probability. Thus, an outdoor method can be used to find the mobile device location with HCS_PRIO 3.

A cell with HCS_PRIO equals to '4', it can be considered mobile is located in outdoor with 40% probability. Thus, indoor method can be used to find the mobile device location with HCS_PRIO 4.

A cell with HCS_PRIO equals to '5', it can be considered mobile is located in outdoor with 20% probability. Thus, indoor method can be used to find the mobile device location with HCS_PRIO 5.

In the embodiment, the HCS_PRIO, Number of Cell Reselections (NCR) Cell reselections within Timer for Reselection (TCR), as mentioned in 3GPP RR/RRC Specifications time duration method of estimation of mobility (already defined in 3GPP) can be easily used and indoor and outdoor can be estimated and proper LBS initial method can be chosen.

At step 406, if the method 400 identifies that the mobile device is not in 2G or 3G network then step 420 is performed. At step 420, the method checks whether the mobile device is in a Long Term Evolution communication standard and/or a Release 8 a third generation wireless communication standard. The method performs step 422 if the mobile device in a Long Term Evolution communication standard and/or a Release 8 a third generation wireless communication standard otherwise step 426 is performed. At step 422, the method reads femto cell status. At step 424, the method identifies whether the mobile device is served by a femto cell or not. If the mobile device is served by the femto cell then step 412 is performed, otherwise step 416 is performed.

At step 412, a positioning method for indoor environment is selected to identify the location of the mobile device if the mobile device is served by a femto cell. In the embodiment, the positioning method is at least one of a Cell-Identification method, an Enhanced Observed Time Difference method, and a Wireless Fidelity (WiFi) Positioning System (WPS) method. Thereafter, the step 426 is performed.

At step 416, a second positioning method for outdoor environment is selected to identify the location of the mobile device if the mobile device is served by a cell other than the femto cell for communication. In the embodiment, the second positioning method is at least one of a Global Positioning System (GPS), an Assisted GPS (AGPS) method and one of a satellite method. Thereafter, the step 426 is performed. At step 426, the method 400 is terminated.

Exemplary embodiments of the present invention provide a method to identify location of a mobile device in a wireless communication network. The method provides a way to estimate a proper location estimation algorithm based on camped protocol information of mobile device using a cross layer approach. The method allows the mobile device to choose a best possible location estimation method. The estimation methods include, but are not limited to, GPS, A-GPS, WPS, Cell ID, OTDOA, and/or E-OTD. This in turn saves time in getting the first position fix and also saves mobile device battery. Further, the method also reduces unnecessary GPS Satellite and respective WiFi signal scanning.

In the preceding specification, the present disclosure and its advantages have been described with reference to exemplary embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of present disclosure.

Exemplary embodiments of the present disclosure are related to the use of a computer system for implementing the techniques described herein. In one exemplary embodiment, the techniques are performed by a processor by using information included in a memory. Such information can be read into the main memory from a machine-readable medium, such as a storage device. The information included in the memory causes the processor to perform the method described herein.

The term "machine-readable medium" as used herein refers to any medium that participates in providing data that causes a machine to operation in a specific fashion. In an exemplary embodiment which is implemented using the computer system, various machine-readable mediums are involved, for example, in providing information to the processor for execution. The machine-readable medium can be a storage media. Storage media includes both non-volatile media and volatile media. Non-volatile media includes, for example, optical or magnetic disks, such as a server storage unit. Volatile media includes dynamic memory. All such media must be tangible to enable the information carried by the media to be detected by a physical mechanism that reads the information into a machine.

Common forms of machine-readable medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge.

In an exemplary embodiment, the machine-readable medium can be a transmission media including coaxial cables, copper wire and fiber optics, including the wires that include a bus. Transmission media can also take the form of acoustic or light waves, such as those generated during radio-wave and infra-red data communications. Examples of machine-readable medium may include, but are not limited to, a carrier wave as or any other medium from which a computer can read, for example online software, download links, installation links, and online links.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for identifying the location of a mobile device in a wireless communication network, the method comprising:
if the mobile device is camped on at least one of a GSM or UMTS network: identifying Hierarchical Cell Structure (HCS) priority number of a cell currently in use by the mobile device;
selecting a first positioning method to identify the location of the mobile device when the HCS priority number is greater than a first predefined number;

selecting a second positioning method to identify the location of the mobile device when the HCS priority number is smaller than a second predefined number; and performing a probabilistic method to select one of the first positioning method and the second positioning method to identify the location of the mobile device when the HCS priority number is between the first predefined number and the second predefined number;

if the mobile device is not camped on at least one of a GSM or UMTS network: obtaining femto cell status in the wireless communication network; selecting a third positioning method to identify the location of the mobile device when the mobile device is using a femto cell for communication and the mobile device is determined to be in an indoor environment based on association with the femto cell; and selecting a fourth positioning method to identify the location of the mobile device when the mobile device is using a cell other than the femto cell for communication and the mobile device is determined to be in an outdoor environment based on association with the cell other than the femto cell.

2. The method of claim 1, wherein the first positioning method is suitable for indoor and low mobility environment and comprises at least one of a Cell-Identification method, an Enhanced Observed Time Difference method, and a Wireless Fidelity (WiFi) Positioning System (WPS) method.

3. The method of claim 1, wherein the second positioning method is suitable for outdoor and high mobility environment comprises at least one of a Global Positioning System (GPS), an Assisted GPS (AGPS) method, and a satellite method.

4. The method of claim 1, wherein a range of predefined HCS priority numbers defined in the wireless communication network is from zero to seven.

5. The method of claim 1, wherein the first predefined number is five.

6. The method of claim 1, wherein the second predefined number is two.

7. The method of claim 1, wherein the probabilistic method is performed when the HCS priority value is greater than one and smaller than six.

8. The method of claim 1, wherein the first positioning method is selected when the mobile device is in indoor environment, wherein information regarding the indoor environment is identified based on the HCS priority number.

9. The method of claim 1, wherein the second positioning method is selected when the mobile device is in outdoor environment, wherein information regarding the outdoor environment is identified based on the HCS priority number.

10. The method of claim 1, wherein if the mobile device is not camped on at least one of a GSM or UMTS network, the wireless communication network is a Long Term Evolution communication network.

11. The method of claim 1, wherein a probability of the mobile device being indoors or outdoors is determined as a function of the HCS priority number.

12. A method for identifying the location of a mobile device in a wireless communication network, the method comprising:

if the mobile device is camped on at least one of a GSM or UMTS network: identifying Hierarchical Cell Structure (HCS) priority number of a cell currently in use by the mobile device;

selecting a first positioning method to identify the location of the mobile device when the HCS priority number is greater than a first predefined number;

selecting a second positioning method to identify the location of the mobile device when the HCS priority number is smaller than a second predefined number; and performing a probabilistic method to select one of the first positioning method and the second positioning method to identify the location of the mobile device when the HCS priority number is between the first predefined number and the second predefined number;

if the mobile device is camped on at least one of a GSM or UMTS network: obtaining femto cell status in the wireless communication network;

selecting a third positioning method to identify the location of the mobile device when the femto cell is serving the mobile device and the mobile device is using the femto cell for communication; and selecting a fourth positioning method to identify the location of the mobile device when the mobile device is using a cell other than the femto cell for communication;

wherein, the first and third positioning methods are each at least one of a Cell-Identification method, an Enhanced Observed Time Difference method, and a Wireless Fidelity (WiFi) Positioning System (WPS) method; and the second and fourth positioning methods are each at least one of a Global Positioning System (GPS), an Assisted GPS (AGPS) method and a satellite method.

* * * * *